3,162,667
HYDROCARBONTHIOPHOSPHONOXYHYDROXY-
OXAALKYLHYDROCARBYLAMINE
David D. Reed, Glenham, and James M. Petersen, Fishkill, N.Y., and Herman D. Kluge, deceased, late of Fishkill, N.Y., by Hazel E. Kluge, administratrix, Fishkill, N.Y., assignors to Texaco Inc., New York, N.Y., a corporation of Delaware
No Drawing. Filed Oct. 18, 1962, Ser. No. 231,600
10 Claims. (Cl. 260—461)

This invention relates to novel reaction products of epoxyalkylhydrocarbylamines and hydroxyalkyl hydrocarbonthiophosphonates. More particularly, the subject invention pertains to mono- or bis(hydrocarbonthiophosphonoxyhydroxyoxaalkyl)hydrocarbylamines, and their method of manufacture.

The mono- or bis(hydrocarbonthiophosphonoxyhydroxyoxaalkyl)hydrocarbylamines hereafter known for reasons of brevity as hydroxyoxaalkylhydrocarbylamines are represented by the formula:

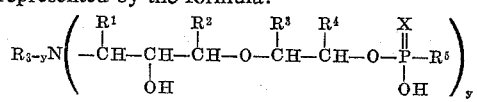

where R is a monovalent hydrocarbon derived radical selected from the group consisting of alkyl, aryl, alkaryl or aralkyl of from 1 to 20 carbons; $R^1$, $R^2$, $R^3$ and $R^4$ are radicals selected from the group consisting of hydrogen or alkyl of from 1 to 6 carbons; $R^5$ is hydrocarbyl (monovalent hydrocarbon derived radical), X is a chalcogen selected from the group consisting of sulfur or a mixture of oxygen and sulfur and $y$ is an integer from 1 to 2, inclusively.

The hydroxyoxaalkylhydrocarbylamines of this invention are useful as thermal stability additives for fuels such as jet fuel.

Broadly, the hydroxyoxaalkylhydrocarbylamines are prepared by the reaction of an epoxyalkylhydrocarbylamine with a hydroxyalkyl hydrocarbonthiophosphonate optionally in the presence of acid or basic catalyst.

PREPARATION OF THE HYDROXYALKYL HYDROCARBONTHIOPHOSPHONATE REACTANT

The hydroxyalkyl hydrocarbonthiophosphonate reactant is described in co-assigned, copending application Serial No. 59,505, now Pat. No. 3,087,956, filed September 30, 1960. Further, its manufacture is additionally described in co-assigned, copending application 63,973, now Pat. No. 3,123,630, filed October 21, 1960.

The hydroxyalkyl hydrocarbonthiophosphonates are prepared by first forming a complex hydrocarbon-$P_2S_5$ reaction product. As is well known the hydrocarbon-$P_2S_5$ products are prepared by reaction of aromatic hydrocarbons, cycloaliphatic hydrocarbons and aliphatic hydrocarbons with $P_2S_5$ at elevated temperature. Although a wide variety of hydrocarbons such as alkarenes and aralkanes are usable as reactants, polyolefins are generally employed as the hydrocarbon reactant. Lubricating fractions constitute another preferred class of materials for reaction with $P_2S_5$. Another source of hydrocarbon is olefins prepared by halogenation of high molecular weight hydrocarbon fractions and subsequent dehydrohalogenation. Olefin fractions obtained by cracking of high molecular weight hydrocarbon fractions may also be used as the hydrocarbon reactant or with $P_2S_5$.

The olefinic hydrocarbons which react with $P_2S_5$ usually contain at least 12 carbon atoms although lower molecular weight olefins can be employed. Monoolefins polymers such as polyisobutylene, polybutene, polypropylene and copolymers of monoolefins such as propylene-butylene copolymer are particularly preferred materials for reaction with $P_2S_5$. In general, olefin polymers and copolymers having an average molecular weight of between about 250 and 50,000 are employed with polymers and copolymers having an average molecular weight in the range of 600 to 5,000 being particularly preferred. Copolymers of conjugated dienes and monoolefins such as copolymer of butadiene and isobutylene having an average molecular weight in the above described range are also suitable as hydrocarbon reactant for the $P_2S_5$.

The hydrocarbon-$P_2S_5$ reaction product is formed by reacting $P_2S_5$ with the hydrocarbon at a temperature from about 100 to 320° C. in a non-oxidizing atmosphere, for example, under a blanket of nitrogen. The $P_2S_5$ normally constitute between about 5 and 40 wt. percent of the reaction mixture. The resultant $P_2S_5$-hydrocarbon product is then hydrolyzed at a temperature between about 100 and 260° C. by contact with steam. The steam treatment converts the hydrocarbon-$P_2S_5$ product to a hydrocarbonthiophosphonic acid and inorganic phosphorus acids. The hydrocarbonthiophosphonic acid has the general formula:

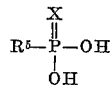

wherein $R^5$ is a monovalent hydrocarbon radical derived from the charged hydrocarbon in the formation of the hydrocarbon-$P_2S_5$ reaction product. $R^5$ is usually a polymonoolefin derived radical containing from 20 to 200 carbon atoms and X is sulfur or a mixture of sulfur and oxygen. X in the above formula is designated as sulfur or a mixture of sulfur and oxygen because the steam hydrolysis step usually results in the replacement with oxygen of a portion of the sulfur joined to the phosphorus.

The thus formed thiophosphonic acid is reacted with epoxyalkane of the formula:

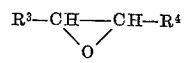

at a temperature between about 60 to 150° C. in the presence of between atmospheric and 500 p.s.i.g. pressure to form the hydroxyalkyl hydrocarbonthiophosphonate of the formula:

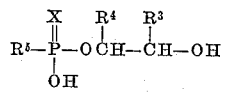

wherein $R^3$, $R^4$, X and $R^5$ are as heretofore defined. Examples of the hydroxyalkyl hydrocarbonthiophosphonate reactants contemplated herein are 2-hydroxyethyl polybutene(940 M.W.)thiophosphonate; 1,2 - diethyl - 2-hydroxyethyl polypropylene(1500 M.W.)thiophosphonate; 1 - methyl - 2 - propyl - 2 - hydroxyethyl polyisobutylene(2000 M.W.)thiophosphonate; and 1-propyl-2-hydroxyethyl butadiene - isobutylene copolymer(2500 M.W.)thiophosphonate.

The inorganic phosphorus acids formed during the hydrolysis are removed prior to the reaction with the epoxyalkane reactant. A number of different procedures are available for removal of the inorganic phosphorus acids. In U.S. Patent Nos. 2,951,835 and 2,987,512, removal of the inorganic phosphorus acids is affected by contact with synthetic hydrous alkali metal silicates and synthetic hydrous alkaline earth metal silicates, respectively. In commonly-assigned, copending application, Serial No. 841,668, filed September 23, 1959 by H. D. Kluge and R. G. Lacoste, a process is described wherein inorganic phosphorus acids are removed from the hydrolyzed product by extraction with anhydrous methanol.

EPOXYALKYLHYDROCARBYLAMINE REACTANT

The epoxyalkylhydrocarbylamine reactant which reacts with the hydroxyalkyl hydrocarbonthiophosphonate to form the novel hydroxyoxaalkyl hydrocarbylamines of the invention is represented by the following general formula:

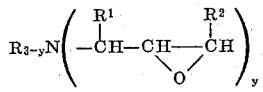

where R, $R^1$, $R^2$ and $y$ are as heretofore defined. Specific examples of the epoxyalkylhydrocarbylamines contemplated herein are 2,3-epoxypropyldiethylamine, N,N-bis (2,3-epoxypropyl)butylamine, N,N-bis(2,3-epoxypropyl) aniline; N,N-bis(1-methyl-2,3 - epoxybutyl)benzylamine; and 2,3-epoxypropylditolylamine.

CATALYST

As heretofore stated, acid and base catalyst may be optionally employed in the production of the products of the invention. For maximum yields, catalyst is desirable. Examples of acid and base catalysts contemplated herein are the Lewis acids, mineral acids, organic acids, alkali metals and alkali metal alcoholates. Specific examples are $BF_3 \cdot C_2H_5OC_2H_5$ (boron trifluoride etherate), $BF_3$, HF, $AlCl_3$, $SnCl_4$, $TiCl_4$, $ZnCl_2$, $H_2SO_4$, $H_3PO_4$, $CCl_3CO_2H$, $CF_3CO_2H$, Na, and $C_2H_5OK$.

PREPARATION OF THE NOVEL HYDROXYOXAALKYLHYDROCARBYLAMINES OF THE INVENTION

The reaction of the epoxyalkylhydrocarbylamine with the hydroxyalkyl hydrocarbonthiophosphonate to produce the hydroxyoxaalkylhydrocarbylamines is effected at a temperature between about 25 and 150° C., at a reactant mole ratio of amine to thiophosphonate between about 0.1:1 and 5:1 under essentially atmospheric pressure. If catalyst is employed, the ratio of amine reactant to thiophosphonate reaction to catalyst should be between about 0.1:1:0.001 and 5:1:0.01.

When a bis(hydroxyoxaalkyl)hydrocarbylamine is desired, the reactant mole ratio should be at least about 1:2 epoxide:thiophosphonate for stoichiometric addition. The final hydrocarbylamine product can be purified by standard means. One such standard means is stripping out the unreacted reactants with an inert gas such as nitrogen under reduced pressure, e.g., between about 0.1 and 50 mm. Hg and elevated temperature at least about 100° C. Another means is percolating the product through adsorbent clay or ion exchange resin.

Specific examples of the hydroxyoxaalkylhydrocarbylamines contemplated herein are 6-polybutene(940 M.W.) thiophosphonoxy-2-hydroxy - 4 - oxahexyldiethylamine; 6-polybutene(940 M.W.)thiophosphonoxy - 2 - hydroxy - 4-oxahexyldiphenylamine; bis(6 - polybutene(940 M.W.) thiophosphonoxy - 2 - hydroxy - 4 - oxahexyl)butylamine; N,N - bis(6 - polybutene(940 M.W.)thiophosphonoxy - 2-hydroxy - 4 - oxahexyl)aniline; 6 - polyisopropylene(2000 M.W.)thiophosphonoxy-1,5-dimethyl-2-hydroxy - 4 - oxahexylditolylamine and bis(6 - polypropylene(2500 M.W.) thiophosphonoxy-6-ethyl-2-hydroxy - 4 - oxahexyl)benzylamine.

The following examples further illustrate the invention but are not to be construed as limitations thereof. Example I illustrates the preparation of the hydroxyalkyl hydrocarbonthiophosphonate from a polyolefin $P_2S_5$ and water. Examples II to V illustrate the preparation of the hydroxyoxaalkylhydrocarbylamines of the invention from the thiophosphonate prepared by the method described in Example I.

Example I

A polybutene-$P_2S_5$ intermediate product was prepared by reacting polybutene of an average molecular weight of about 940 with $P_2S_5$ at a temperature of 232° C. for a period of 10 hours in a mole ratio of polybutene to $P_2S_5$ of 1.1:1 in the presence of sulfur in an amount equal to 3 wt. percent based on the polybutene. The reaction product was diluted with 150 wt. percent of a naphthene base oil having an SUS viscosity at 100° F. of 100, and then steamed at 350° for 10 hours in a nitrogen atmosphere. The steamed product was dried by passing nitrogen therethrough at 176° C. for a 4 hour period. The steamed product was then extracted with 50% by volume of methanol at 55° C. to give a methanol extract containing inorganic phosphorus acid and a lubricating oil raffinate containing a thiophosphonic acid of the formula:

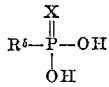

where $R^5$ is a polybutene radical of an average molecular weight of 940. Analysis of the oil solution of thiophosphonic acid found it to have a sulfur content of 0.51 wt. percent. The theoretical sulfur content when X is entirely sulfur is 1.29 wt. percent indicating that X in the above formula of thiophosphonic acid is a mixture of sulfur and oxygen. The thiophosphonic acid was found to have a Neut. No. of 22.6.

7000 grams of an oil solution, prepared as above, containing 2.71 mole based on Neut. No. of polybutene thiophosphonic acid was charged to a 12 liter 3-neck flask equipped with stirrer, gas inlet tube extending below the surface of the acid reactant, a thermometer immersed in the acid and a reflux condenser. The acid was heated to 121° C. over a 1 hour period with stirring and nitrogen blowing. Ethylene oxide was then mixed with nitrogen and introduced into the reaction flask at a rate so as to maintain general reflux. When ethylene oxide was no longer taken up in the reaction, as evidenced by an increase in the reflux rate, its addition was stopped. The excess ethylene oxide in the reaction mixture was allowed to reflux for 1 hour. At the end of this period, ethylene oxide remaining in the flask was expelled therefrom by passing nitrogen therethrough for a 1.5 hour period. The excess ethylene oxide was recovered in a Dry Ice-acetone trap attached to the outlet of the reflux condenser. On cooling, the stripped residue was shown by an analysis to consist of an oil solution 2-hydroxyethyl polybutene(940 M.W.)thiophosphonate of the formula:

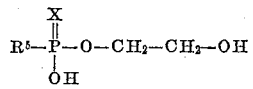

where $R^5$ is a polybutene radical of a 940 average molecular weight and X is a mixture of sulfur and oxygen. The product analyzed as follows:

| Description | Calculated | Found |
|---|---|---|
| Neut. No. | 0.0 | 2.8 |
| Hydroxyl No. | 22 | 30 |
| Phosphorus, wt. percent | 1.2 | 1.1 |
| Sulfur, wt. percent | [1] 1.24 | 0.69 |

[1] X—100% S.

Example II 272 grams of an oil solution containing 0.1 mole of 2-hydroxyethyl polybutene(940 M.W.)thiophosphonate of Example I was charged to a 1 liter, 3-neck flask equipped with a stirrer, thermometer and gas inlet tube. Stirring was begun and the mixture was heated to 93° C. whereupon the 13 grams (0.1 mole) of 2,3-epoxypropyldiethylamine was added to the heated, stirred reaction mixture over a 0.5 hour period and following the addition of the epoxyamine the reaction period was continued for 2 hours. At the end of the reaction period, the unreacted epoxide was removed by stripping out with nitrogen at a temperature of 93° C. under a pressure 1–2 mm. Hg. The stripped product was shown by analysis to consist of an oil solution of 6-polybutene(940 M.W.)thiophosphonoxy-2-hydroxy-4-oxahexyldiethylamine of the formula:

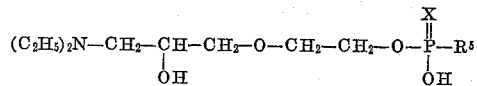

where $R^5$ is a polybutene radical of an average molecular weight of 940 and X is a mixture of sulfur and oxygen. This product analyzed as follows:

| Description | Calculated | Found |
|---|---|---|
| Phosphorus, wt. percent | 1.10 | 1.2 |
| Nitrogen, wt. percent | 0.49 | 0.46 |
| Neut. No | 0 | 0.0 |

*Example III*

An oil solution containing 0.1 mole of 2-hydroxyethyl polybutene(940 M.W.)thiophosphonate prepared in Example I was charged in an amount of 272 grams to a 1 liter 3-neck flask equipped with a stirrer, thermometer and gas inlet tube. To the thiophosphonate there was added dropwise with stirring at a temperature of 93° C., 27 grams (0.1 mole) of 2,3-epoxypropyldiphenylamine. The heating and stirring was continued for a period of 2 hours. At the end of the reaction period, the excess oxide was removed at 93° C. under 1–2 mm. Hg pressure utilizing a nitrogen flush. The stripped residual oil solution product was shown by analysis to contain 6-polybutene(940 M.W.)thiophosphonoxy-2-hydroxy-4-oxahexyldiphenyl-amine of the general formula:

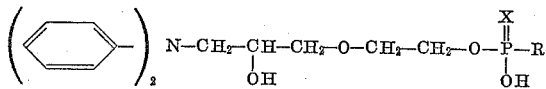

where $R^5$ is a polybutene radical of an average molecular weight of 940 and X is a mixture of sulfur and oxygen. The product analyzed as follows:

| Description | Calculated | Found |
|---|---|---|
| Phosphorus, wt. percent | 1.04 | 0.91 |
| Nitrogen, Wt. percent | 0.47 | 0.57 |
| Sulfur | ¹1.07 | 0.50 |
| Hydroxyl No | 18.8 | 27 |
| Neut. No | 0 | 5.6 |
| Mole ratio, oxide/thiophosphonate reactant in product | 1 | 0.98 |

¹ X—100% S.

*Example IV*

An oil solution containing 0.2 mole of 2-hydroxyethyl polybutene(940 M.W.)thiophosphonate of Example I was charged in an amount of 544 grams to a 1 liter 3-neck flask equipped with a stirrer, thermometer and gas inlet tube. The charged thiophosphonate was heated to a temperature of 93° C. and stirring was begun. To the heated, stirred mixture there was added dropwise 19 grams (0.1 mole) of N,N-bis(2,3-epoxypropyl)butylamine. The reaction was continued over a period of 2 hours. At the end of the reaction period the excess epoxide was removed by stripping it with nitrogen at a temperature of 93° C. under a pressure of 1–2 mm. Hg. The stripped product was shown by analysis to be an oil solution of N,N-bis(6-polybutene(940 M.W.)thiophosphonoxy - 2 - hydroxy - 4 - oxahexyl)butylamine of the formula:

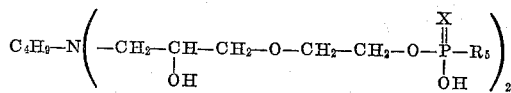

where $R^5$ is a polybutene radical having an average molecular weight of about 940 and X is a mixture of sulfur and oxygen. The product analyzed as follows:

| Description | Calculated | Found |
|---|---|---|
| Nitrogen, wt. percent | 0.25 | 0.23 |
| Hydroxyl No | 20 | 53 |
| Neut. No | 0 | 0.56 |
| Equivalent ratio; oxide/thiophosphonate reactants in product | 1 | 0.90 |

*Example V*

An oil solution containing 0.1 mole of 2-hydroxyethyl polybutene(940 M.W.)thiophosphonate prepared in Example I was charged in an amount of 272 grams to a 1 liter, 3-neck flask equipped with a stirrer, thermometer and gas inlet tube. To the thiophosphonate there was added dropwise 14 grams (0.05 mole) of N,N-bis(2,3-epoxypropyl)aniline at a temperature of 93° C. with stirring. The heating and stirring was continued for a 2 hour period. At the end of the reaction period, the unreacted epoxide was removed by stripping it with oxygen at 93° C. under a pressure of 1–2 mm. Hg. The stripped reaction product was shown by analysis to consist of an oil solution of N,N-bis(6-polybutene(940 M.W.)thiophosphonoxy-2-hydroxy-4-oxahexyl)aniline of the formula:

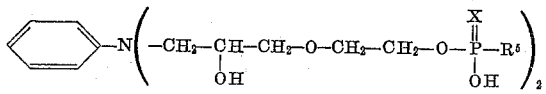

where $R^5$ is a polybutene radical having an average molecular weight of about 940 and X is a mixture of sulfur and oxygen. The product analyzed as follows:

| Description | Calculated | Found |
|---|---|---|
| Phosphorus, wt. percent | 1.09 | 0.96 |
| Nitrogen, wt. percent | 0.25 | 0.33 |
| Sulfur, wt. percent | ¹1.12 | 0.56 |
| Hydroxyl No | 19.7 | 33 |
| Equivalent ratio, oxide/thiophosphonate reactant in product | 1 | 0.93 |

¹ X—100% S.

We claim:

1. A hydroxyoxaalkylhydrocarbylamine of the formula:

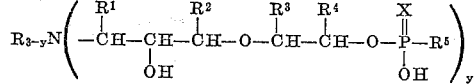

where R is an organic member of not more than 20 carbons selected from the group consisting of alkyl, phenyl, alkylphenyl, and phenylalkyl, $R^1$, $R^2$, $R^3$ and $R^4$ are selected from the group consisting of hydrogen and alkyl from 1 to 6 carbons, $R^5$ is hydrocarbyl derived from an aliphatic polyolefin having a molecular weight between 250 and 50,000, X is chalcogen selected from the group consisting of sulfur and a mixture consisting of a major portion of sulfur and a minor portion of oxygen and y is an integer from 1 to 2, inclusively.

2. A hydroxyoxaalkylhydrocarbylamine in accordance with claim 1 where R is ethyl, $R^1$, $R^2$, $R^3$ and $R^4$ are hydrogen, $R^5$ is a polybutene having an average molecular weight of 940, X is a mixture consisting of a major portion of sulfur and a minor portion of oxygen and y is 1.

3. A hydroxyoxaalkylhydrocarbylamine in accordance with claim 1 where R is phenyl, $R^1$, $R^2$, $R^3$ and $R^4$ are hydrogen, $R^5$ is a polybutene having an average molecular weight of 940, X is a mixture consisting of a major portion of sulfur and a minor portion of oxygen and y is 1.

4. A hydroxyoxaalkylhydrocarbylamine in accordance with claim 1 where R is butyl, $R^1$, $R^2$, $R^3$ and $R^4$ are hydrogen, $R^5$ is a polybutene having an average molecular weight of 940, X is a mixture consisting of a major portion of sulfur and a minor portion of oxygen and y is 2.

5. A hydroxyoxaalkylhydrocarbylamine in accordance with claim 1 where R is phenyl, $R^1$, $R^2$, $R^3$ and $R^4$ are hydrogen, $R^5$ is a polybutene having an average molecular weight of 940, X is a mixture consisting of a major portion of sulfur and a minor portion of oxygen and $y$ is 2.

6. A method of producing a hydroxyoxaalkylhydrocarbylamine of the formula:

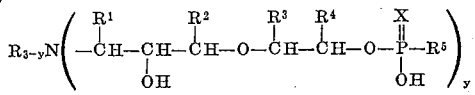

where R is an organic member of not more than 20 carbons selected from the group consisting of alkyl, phenyl, alkylphenyl and phenylalkyl, $R^1$, $R^2$, $R^3$ and $R^4$ are selected from the group consisting of hydrogen and alkyl from 1 to 6 carbons, X is a chalcogen selected from the group consisting of sulfur and a mixture consisting of a major portion of sulfur and a minor portion of oxygen, $R^5$ is hydrocarbyl derived from an aliphatic polyolefin having a molecular weight between 250 and 50,000, and $y$ is a whole integer from 1 to 2, inclusively, comprising reacting an epoxyamine compound of the formula:

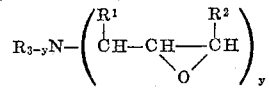

with a hydroxyalkyl hydrocarbonthiophosphonate of the formula:

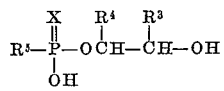

where $R^1$, $R^2$, $R^3$, $R^4$, $R^5$, X and $y$ are as heretofore defined, at a temperature of between about 25 and 150° C. and at a mole ratio of said amine to said thiophosphonate reactant between about 0.1:1 and 5:1.

7. A process in accordance with claim 6 where R is ethyl, $R^1$, $R^2$, $R^3$ and $R^4$ are hydrogen, $R^5$ is a polybutene having an average molecular weight of 940, X is a mixture consisting of a major portion of sulfur and a minor portion of oxygen and $y$ is 1.

8. A process in accordance with claim 6 where R is butyl, $R^1$, $R^2$, $R^3$ and $R^4$ are hydrogen, $R^5$ is a polybutene having an average molecular weight of 940, X is a mixture consisting of a major portion of sulfur and a minor portion of oxygen and $y$ is 2.

9. A process in accordance with claim 6 where R is phenyl, $R^1$, $R^2$, $R^3$ and $R^4$ are hydrogen, $R^5$ is a polybutene having an average molecular weight of 940, X is a mixture consisting of a major portion of sulfur and a minor portion of oxygen and $y$ is 2.

10. A process in accordance with claim 6 where R is phenyl, $R^1$, $R^2$, $R^3$ and $R^4$ are hydrogen, $R^5$ is a polybutene having an average molecular weight of 940, X is a mixture consisting of a major portion of sulfur and a minor portion of oxygen and $y$ is 1.

No references cited.